(12) United States Patent
Hofmann et al.

(10) Patent No.: US 10,775,174 B2
(45) Date of Patent: Sep. 15, 2020

(54) MAP FEATURE EXTRACTION SYSTEM FOR COMPUTER MAP VISUALIZATIONS

(71) Applicant: Mapbox, Inc., San Francisco, CA (US)

(72) Inventors: Daniel Hofmann, Berlin (DE); Bhargav Kowshik KR, Bangalore (IN)

(73) Assignee: Mapbox, Inc., San Francisco, CA (US)

( * ) Notice: Subject to any disclaimer, the term of this patent is extended or adjusted under 35 U.S.C. 154(b) by 97 days.

(21) Appl. No.: 16/237,648

(22) Filed: Dec. 31, 2018

(65) Prior Publication Data

US 2020/0072610 A1 Mar. 5, 2020

Related U.S. Application Data

(60) Provisional application No. 62/724,988, filed on Aug. 30, 2018.

(51) Int. Cl.
| | |
|---|---|
| *G01C 21/00* | (2006.01) |
| *G06K 9/46* | (2006.01) |
| *G06K 9/62* | (2006.01) |
| *G06K 9/00* | (2006.01) |
| *G06N 3/08* | (2006.01) |

(52) U.S. Cl.
CPC ....... *G01C 21/005* (2013.01); *G06K 9/00637* (2013.01); *G06K 9/00651* (2013.01); *G06K 9/4647* (2013.01); *G06K 9/6262* (2013.01); *G06N 3/08* (2013.01)

(58) Field of Classification Search
CPC ............. G01C 21/005; G06K 9/00637; G06K 9/00651; G06K 9/4647; G06K 9/6262; G06K 9/0063; G06K 9/6202; G06K 9/2054; G06K 9/6256; G06K 9/4609; G06K 9/4652; G06K 9/4671; G06N 3/08; G06T 2207/10032; G06T 2207/30184; G06T 2207/20081; G06T 2207/30181; G06T 2207/30192; G06T 2207/10028; G06T 2207/20084; G06T 2207/30242; G06T 7/73; G06T 7/62; G06T 7/74
See application file for complete search history.

(56) References Cited

U.S. PATENT DOCUMENTS

| | | | |
|---|---|---|---|
| 7,869,667 B1 * | 1/2011 | Wu ...................... | G06K 9/4609 382/113 |
| 7,912,296 B1 * | 3/2011 | Zelinka .................. | G01C 21/00 345/626 |

(Continued)

*Primary Examiner* — Michael S Osinski
(74) *Attorney, Agent, or Firm* — Fenwick & West LLP

(57) ABSTRACT

A feature extraction system extracts map features from an aerial image. The feature extraction system receives an aerial image having pixels and predicts, for each pixel, a probability that the pixel corresponds to a map feature based on a machine learning model. The machine learning model is trained to determine a probability that a pixel corresponds to the map feature based on a training dataset comprising pairs of aerial images and corresponding mask images that describe known instances of the map feature. The feature extraction system identifies a subset of pixels of the plurality of pixels. Each pixel in the subset has a predicted probability that is greater than or equal to a threshold probability that a pixel corresponds to the map feature. The feature extraction system further determines a bounded geometry enclosing the identified subset of pixels, the bounding geometry encompassing an instance of the map feature.

17 Claims, 9 Drawing Sheets

(56) References Cited

U.S. PATENT DOCUMENTS

| | | | | |
|---|---|---|---|---|
| 8,170,282 B1* | 5/2012 | Roskovensky | ...... | G06K 9/0063 367/118 |
| 8,594,375 B1* | 11/2013 | Padwick | ............. | G06K 9/0063 382/103 |
| 8,655,070 B1* | 2/2014 | Yang | ................. | G06K 9/00657 382/100 |
| 9,940,724 B2* | 4/2018 | Jia | ........................ | G06K 9/0063 |
| 10,013,785 B2* | 7/2018 | Hay | ........................ | G06T 7/337 |
| 10,192,323 B2* | 1/2019 | Babenko | ................... | G06T 7/62 |
| 10,217,236 B2* | 2/2019 | Kraft | ................. | G06K 9/00637 |
| 10,223,816 B2* | 3/2019 | Dorum | ..................... | G06T 11/20 |
| 10,546,195 B2* | 1/2020 | Lo | ........................ | G06K 9/6267 |
| 10,553,020 B1* | 2/2020 | Hainline | ................. | G06T 15/60 |
| 10,607,362 B2* | 3/2020 | Kraft | .................... | G06K 9/6277 |
| 10,664,954 B1* | 5/2020 | Warren | ................... | G06T 5/002 |
| 2006/0041375 A1* | 2/2006 | Witmer | ................... | G01C 15/00 701/352 |
| 2008/0166024 A1* | 7/2008 | Iketani | ................. | G06K 9/6228 382/107 |
| 2010/0085440 A1* | 4/2010 | Fujita | ........................ | G06T 7/74 348/222.1 |
| 2011/0286660 A1* | 11/2011 | Ofek | ....................... | G06T 19/20 382/154 |
| 2013/0163811 A1* | 6/2013 | Oelke | ...................... | G06K 9/46 382/103 |
| 2013/0211790 A1* | 8/2013 | Loveland | ........... | G06K 9/00637 703/1 |
| 2014/0029844 A1* | 1/2014 | Padwick | ............... | G06K 9/0063 382/165 |
| 2015/0030255 A1* | 1/2015 | Wu | ..................... | G06K 9/00664 382/224 |
| 2015/0065178 A1* | 3/2015 | Beauregard | ........... | G01S 5/0252 455/456.6 |
| 2015/0071528 A1* | 3/2015 | Marchisio | ............ | G06K 9/6269 382/159 |
| 2015/0199557 A1* | 7/2015 | Zhang | .................. | G06K 9/6202 382/197 |
| 2016/0005145 A1* | 1/2016 | Seitz | ..................... | G06T 3/0093 382/154 |
| 2016/0187022 A1* | 6/2016 | Miwa | ....................... | G01V 8/10 250/349 |
| 2016/0343152 A1* | 11/2016 | Hay | ...................... | G06T 7/337 |
| 2017/0147901 A1* | 5/2017 | Klein | ..................... | G06K 9/0063 |
| 2017/0293800 A1* | 10/2017 | Babenko | .............. | G06K 9/6255 |
| 2018/0053054 A1* | 2/2018 | Schultz | .................. | G01S 19/39 |
| 2018/0067952 A1* | 3/2018 | Behm | .................... | G06F 16/29 |
| 2018/0075605 A1* | 3/2018 | Jia | ............................ | G06K 9/00986 |
| 2018/0157911 A1* | 6/2018 | Lo | .............................. | G06T 7/73 |
| 2018/0232900 A1* | 8/2018 | Kraft | .................... | G06K 9/6277 |
| 2019/0057245 A1* | 2/2019 | Khandelwal | ......... | G06K 9/0063 |

\* cited by examiner

220

230

MAP FEATURE EXTRACTION SYSTEM FOR COMPUTER MAP VISUALIZATIONS

CROSS-REFERENCE TO RELATED APPLICATION

This application claims the benefit under 35 U.S.C. § 119(e) of provisional application 62/724,988, filed Aug. 30, 2018, the entire contents of which is hereby incorporated by reference for all purposes as if fully set forth herein.

BACKGROUND

This disclosure relates to digital maps. More specifically, this disclosure relates to extracting map features from an aerial image for inclusion in a digital map.

Digitally stored electronic maps are used to represent geographic information of an area and are displayed to users of mobile and other computing devices, for example, using any of a wide array of standalone map or direction application programs or apps. Electronic maps commonly include data describing various geographic features, such as built features (roads, buildings, etc.), geological features (rivers, lakes, etc.), political features (e.g., borders of countries, states, counties, etc.). The labelling and categorization of such features is often incomplete, which can limit the utility of current electronic maps. For example, electronic maps and graphical user interfaces for digital maps have entered wide use in ride sharing applications. When various map features such as parking lots are not well marked, determining a pick-up location for ride sharing customers can be difficult and inconvenient, wasting both the driver's and the rider's time. Current labelling of map features is typically done manually or by integrating existing data sets into an electronic map. However, existing data sets are incomplete, and manual entry of missing features is slow and inefficient, and is affected by human error. It is particularly difficult for feature labeling in electronic maps to keep pace with new development, such as the construction of new buildings or parking lots.

SUMMARY

This disclosure relates to an efficient method for extracting map features from aerial images. A map feature is any physical feature that can be represented on a map. For example, map features can represent built features (roads, buildings, parking lots, etc.) and geological features (rivers, lakes, other bodies of water, mountains, clouds, etc.). The process described herein uses machine learning to detect map features based on aerial images. This allows map features to be much more quickly and accurately detected than prior manual processes. By automatically detecting map features, the features can be quickly integrated into electronic maps, e.g., as soon as updated aerial images for a region are available.

To extract map features from aerial images, a feature extraction system receives one or more aerial images for a region, such as images taken from an aircraft or drone. The feature extraction system uses a machine learning model that was trained to predict probabilities that the pixels in a given aerial image correspond to a given map feature, such as a parking lot. The feature extraction system identifies a set of pixels that have high probabilities of corresponding to the given map feature, and then determines a polygon that encloses the identified pixel. The polygon containing the high-probability pixels is labelled as an instance of the map feature and added to an electronic map.

In an embodiment, a feature extraction system extracts map features from an aerial image. The feature extraction system receives an aerial image comprising a plurality of pixels. The feature extraction system predicts, for each pixel of the plurality of pixels, a probability that the pixel corresponds to a map feature based on a machine learning model. The machine learning model is trained to determine a probability that a pixel corresponds to the map feature based on a training dataset comprising pairs of aerial images and corresponding mask images. Each mask image in a pair describes a known instance of the map feature. The feature extraction system further identifies a subset of pixels of the plurality of pixels. Each pixel in the subset has a predicted probability that is greater than or equal to a threshold probability that a pixel corresponds to the map feature. The feature extraction system further determines a bounded geometry enclosing the identified subset of pixels, the bounding geometry encompassing an instance of the map feature.

Figure 1A:
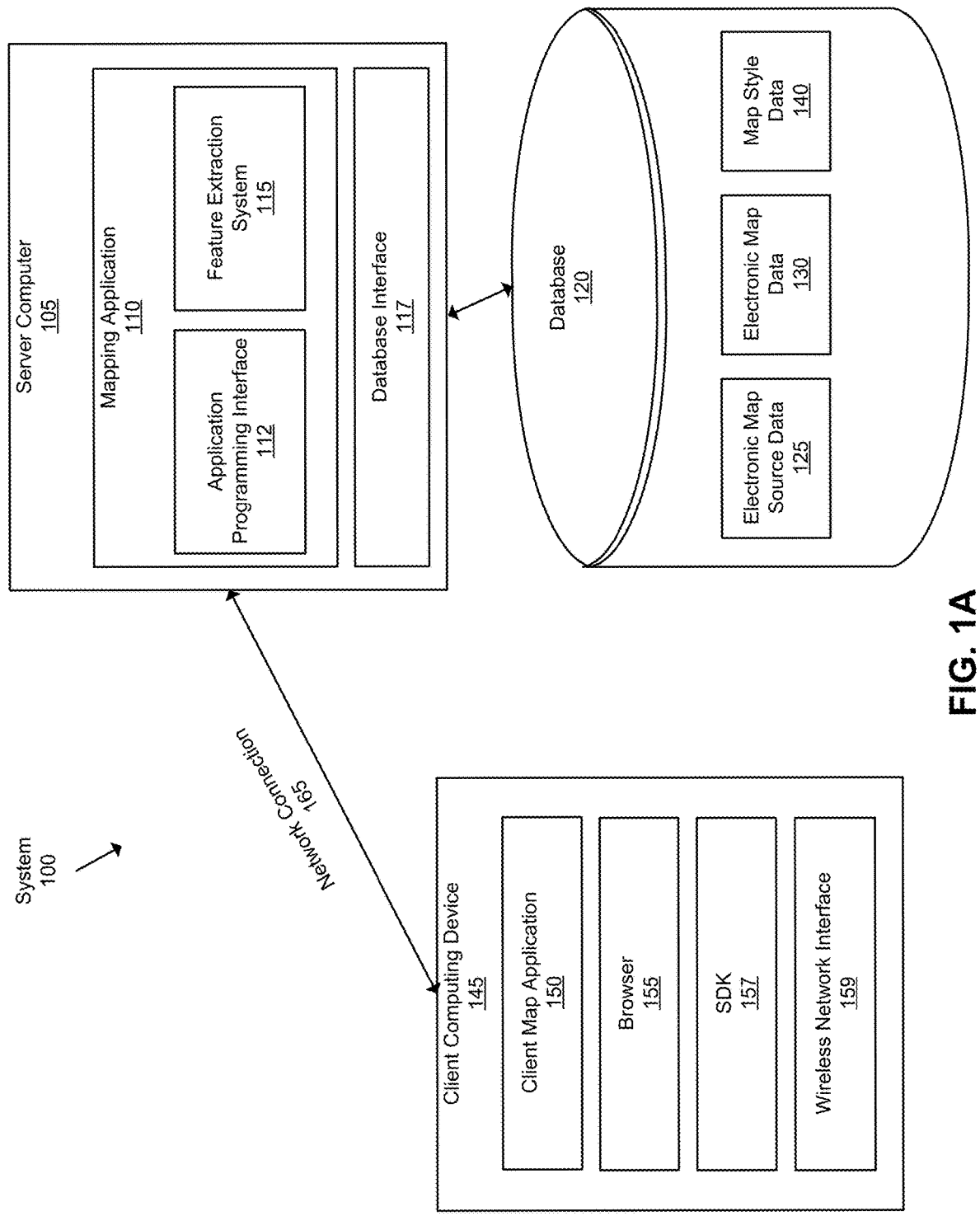
FIG. 1A illustrates an example computer system in which the techniques described herein may be practiced according to one or more embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

FIG. 1A illustrates an example computer system in which the techniques described may be practiced according to one or more embodiments.

In an embodiment, a computer system 100 comprises a plurality of components that may be implemented at least partially by hardware at one or more computing devices, such as one or more hardware processors executing stored program instructions stored in one or more memories for performing the functions that are described herein. In other words, in an embodiment, all functions described herein are intended to indicate operations that are performed using programming in a special-purpose computer or general-purpose computer, in various embodiments. FIG. 1A illustrates only one of many possible arrangements of components configured to execute the programming described herein. Other arrangements may include fewer or different components, and the division of work between the components may vary depending on the arrangement.

FIG. 1A illustrates a client computing device 145 that is coupled via a network connection 165 to a server computer 105, which is coupled to a database 120. The server computer 105 comprises a mapping application 110, an application programming interface (API) 112, a feature extraction system 115, and a database interface 117. The database 120 comprises electronic map source data 125, electronic map data 130, and map style data 140. The client computing device 145 comprises a client map application 150, browser 155, software development kit (SDK) 157, and wireless network interface 159.

In one embodiment, client computing device 145 is any computing device, such as a work station, personal computer, general purpose computer, laptop, hand-held computer, wearable computer, cellular or mobile phone, portable digital assistant (PDA), tablet computer, and the like. Although a single client computing device is depicted in FIG. 1A, any number of client computing devices may be present. Each client computing device 145 is communicatively connected to server computer 105 through network connection 165 which comprises any combination of a LAN, a WAN, one or more internetworks such as the public Internet, a cellular network, or a company network.

Client computing device 145 also includes network interface 159, which is used by the client computing device 145 to communicate with other devices. In particular, network interface 159 is used to establish network connection 165 to server computer 105. Network interface 159 may use Ethernet, WiFi, WiMAX, Bluetooth, ZigBee, cellular standards, or others.

Client computing device 145 also includes other hardware elements, such as one or more input devices, memory, processors, and the like, which are not depicted in FIG. 1A.

Client computing device 145 also includes applications, software, and other executable instructions to facilitate various aspects of embodiments described herein. These applications, software, and other executable instructions may be installed by a user, owner, manufacturer, or other entity related to the client computing device.

In one embodiment, client computing device 145 includes client map application 155 which is software that displays, uses, supports, or otherwise provides electronic mapping functionality as part of the application or software. Client map application 155 may be any type of application, such as a taxi service, a video game, a chat client, a food delivery application, etc. In an embodiment, client map application 155 obtains electronic mapping functions through SDK 157, which may implement functional calls, callbacks, methods, or other programmatic means for contacting the server computer to obtain digital map tiles, layer data, or other data that can form the basis of visually rendering a map as part of the application. In general, SDK 157 is a software development kit that allows developers to implement electronic mapping without having to design all of the components from scratch. For example, SDK 157 may be downloaded from the Internet by developers, and subsequently incorporated into an application which is later used by individual users.

In one embodiment, client computing device 145 includes browser 155. Browser 155 is a computer application that may request and execute instructions received from web servers to generate complex user interfaces that are presented to a user through one or more devices, such as a display or speakers. In response to input from a user, such as a mouse click indicating that the user selected an object defined in the instructions, such as a button or a text box, a browser may send a request based on the selected object to the web server. The request may be a request for data or include data to be processed by the web server. In an embodiment, browser 155 may receive instructions from server computer 105 to generate a user interface of a map editing program through which a user may create and modify map styles. Additionally or alternatively, client computing device 145 may include a map editing application or software that provides map editing functions as part of the application or software.

Server computer 105 may be any computing device, including but not limited to: servers, racks, work stations, personal computers, general purpose computers, laptops, Internet appliances, wireless devices, wired devices, multiprocessor systems, mini-computers, and the like. Although FIG. 1A shows a single element, the server computer 105 broadly represents one or more multiple server computers, such as a server cluster, and the server computer 105 may be located in one or more physical locations. Server computer 105 may also represent one or more virtual computing instances that execute using one or more computers in a datacenter such as a virtual server farm.

Server computer 105 is communicatively connected to database 120 and client computer device 145 through any kind of computer network using any combination of wired and wireless communication, including, but not limited to: a Local Area Network (LAN), a Wide Area Network (WAN), one or more internetworks such as the public Internet, or a company network. Server computer 105 may host or execute mapping application 110, and may include other applications, software, and other executable instructions, such as database interface 117, to facilitate various aspects of embodiments described herein.

In one embodiment, database interface 117 is a programmatic interface such as JDBC or ODBC for communicating with database 120. Database interface 117 may communicate with any number of databases and any type of database, in any format. Database interface 117 may be a piece of customer software created by an entity associated with mapping application 110, or may be created by a third party entity in part or in whole.

In one embodiment, database 120 is a data storage subsystem consisting of programs and data that is stored on any suitable storage device such as one or more hard disk drives, memories, or any other electronic digital data recording device configured to store data. Although database 120 is depicted as a single device in FIG. 1A, database 120 may span multiple devices located in one or more physical locations. For example, database 120 may include one or nodes located at a data warehouse(s). Additionally, in one embodiment, database 120 may be located on the same device(s) as server computer 105. Alternatively, database 120 may be located on a separate device(s) from server computer 105.

Database 120 may be in any format, such as a relational database, a noSQL database, or any other format. Database 120 is communicatively connected with server computer 105 through any kind of computer network using any combination of wired and wireless communication of the type previously described. Optionally, database 120 may be communicatively connected with other components, either directly or indirectly, such as one or more third party data suppliers. Generally, database 120 stores data related to electronic maps including, but not limited to: electronic map source data 125, electronic map data 130, map tile filter 135, and map style data 140. These datasets may be stored as columnar data in a relational database or as flat files.

In one embodiment, electronic map source data 125 is raw digital map data that is obtained, downloaded, or received from a variety of sources. The raw digital map data may include aerial images, digital street data, building or place data, or terrain data. As used herein, aerial images can include any images taken from an aircraft, satellite, drone, other type of flying object, or any other imaging device that images a region from above. Example sources of aerial images include National Aeronautics and Space Administration (NASA), United States Geological Survey (USGS), and DigitalGlobe. Raw digital map data may also be defined by a user and uploaded to the server computer. Electronic map source data 125 may be updated at any suitable interval, and may be stored for any amount of time. Once obtained or received, electronic map source data 125 is used to generate electronic map data 130. For example, extracted map features from electronic map source data 125 are incorporated into an electronic map as electronic map data 130.

In one embodiment, electronic map data 130 is digital map data that is provided, either directly or indirectly, to client map applications, such as client map application 155, using an API. Electronic map data 130 is based on electronic map source data 125. Specifically, electronic map source data 125 is processed and organized as a plurality of vector map tiles which may be subject to map style data to impose different display styles. Electronic map data 130 may be updated at any suitable interval, and may include additional information beyond that derived from electronic map source data 125.

In an embodiment, electronic map data is divided into a plurality of vector map tiles at a plurality of zoom levels, wherein each map tile corresponds to a portion of a geographic map. For example, a map tile may correspond to a square area of a geographic map at a particular zoom level, or an area of a pre-defined size and location within a geographic map. In an embodiment, the portion of electronic map data within each map tile may be organized in a compact, structured format, such as the Mapbox Vector Tile Specification format, by Mapbox, Inc., San Francisco, Calif. Additionally or alternatively, electronic map data 130 may comprise a plurality of map tile sets. A first set of map tiles may include electronic map data derived from a first set of electronic map source data, while a second set of map tiles may include electronic map data derived from a second set of electronic map source data.

In an embodiment, a map tile contains data describing map geometries, such as points, lines, and polygons, of map features. Additionally or alternatively, the map tile contains metadata, such as road names, place names, house numbers, feature types, and other properties. For example, electronic map data in a vector map tile corresponding to a portion of a geographic map may include geometry data representing roads, buildings, water, parks, and etc. to be depicted within the portion of the geographic map, as well as geometries for suggested placement of labels and other cartographic features. The map tile may also include metadata corresponding to each feature, such as names that can be rendered as labels on a digital map. Additionally or alternatively, the metadata includes data indicating the portion of the geographic map that the map tile corresponds to. For example, the metadata may include data indicating one or more coordinates of the map tile or one or more boundaries of the map tile. Additionally or alternatively, the metadata includes data indicating the zoom level at which that map tile is to be displayed.

In an embodiment, electronic map data is further organized into a plurality of data layers. Electronic map data may describe a plurality of map features, such as buildings, water, roads, etc. The map features may be grouped into the plurality of data layers. For example, a "Road" data layer may include map features such as streets, bridges, freeways, paths, and etc. As another example, a "Water" data layer may include map features such as rivers, lakes, oceans, canals, and etc.

In an embodiment, map tiles are used by program libraries and SDKs, such as SDK 157, as part of displaying maps on a mobile computing device or a browser. A map application or a browser may request one or more map tiles and process the map tiles to cause display of a visual map.

In an embodiment, map tiles are rendered when requested by a client, like a web browser or a mobile application. Rendering may be performed by a rendering library of a client map application or on a server computer. Example rendering libraries include, but are not limited to, Mapbox GL JS, available from Mapbox, Inc., San Francisco, Calif., the Mapbox iOS SDK, Mapbox Android SDK, the Mapbox GL native renderer, or through a Mapbox API.

In an embodiment, a map tile is rendered based on a map style. Each map style of a plurality of map styles can be used to render the same map tile. In other words, the same portion of electronic map data may be displayed in a variety of visual styles. For example, in one map application, map tiles may be displayed with dark colors while in a second map application, map tiles may be displayed with light colors. Additionally or alternatively, the electronic map data required may differ based on map style. For example, in one map application, roads within a map tile may be displayed while buildings are not displayed. In another map application, landscape and rivers may be displayed while roads are not displayed.

In one embodiment, map style data 140 is digital data that defines one or more visual map styles for electronic maps. May style data 140 may comprise a plurality of map styles. A map style defines the visual appearance of an electronic map, such as what map data to display in the electronic map, what order to render the data in, and how to style the data when it is rendered. In an embodiment, a map style may include information including, but not limited to, references to portions of electronic map data 130, map images, fonts, and rules specifying how the portions of electronic map data 130 should be styled when rendering a digital map, such as colors, line styles, line thickness, and etc.

In an embodiment, each map style may be stored as a document. For example, a map style may be stored as a JSON object that adheres to a particular style format specification. A map style may be generated using a map editing program or written independently and uploaded to a server computer.

In an embodiment, a map style comprises one or more map style layers. Each map style layer may include a reference to a portion of electronic map data and one or more visual style rules to be applied to the portion of electronic map data. In an embodiment, the reference to the portion of electronic map data specifies a particular map data source for the maps style layer. For example, the map style may specify a particular map tile set from a plurality of map tile sets as the map data source for the style layer. Additionally or alternatively, the map style layer may specify a particular data layer within the map tile set to associate with the style layer. For example, a style layer may specify visual style rules for a "Water" data layer of a set of map tiles.

In an embodiment, style layer data may include data indicating a style layer type for a map style layer. A map style layer may be a particular map style layer type, such as lines, polygons, symbols, circles, 3D polygons, and images. Additionally or alternatively, the style layer data may specify property values for one or more style layer properties associated with the style layer type. The style layer data may include data indicating property values to associate with each style layer property. In an embodiment, a property value may be a static value. Additionally or alternatively, the property value may be a dynamic value. For example, the property value may be a zoom level dependent value, such as a function that outputs a property value based on an input zoom level.

Each style layer type has a set of properties for which values may be specified. For example, a line style layer type may include style layer properties such as line width, line color, line style (solid, dotted, dashed), line cap style, line positioning, etc. As another example, a polygon style layer type may include style layer properties such as fill color, fill pattern, opacity, anti-aliasing, fill outline color, polygon positioning, etc.

In an embodiment, mapping application 110 provides the API 112 that may be accessed, for example, by client map application 155 using SDK 157 to provide electronic mapping to client map application 155. Specifically, mapping application 110 comprises program instructions that are programmed or configured to perform a variety of backend functions needed for electronic mapping including, but not limited to: receiving map tile requests from client computing devices, sending electronic map data to client computing devices, receiving map style data 140 from map editing applications, receiving electronic map source data 125 from data providers, processing electronic map source data 125 to generate electronic map data 130, and any other aspects of embodiments described herein.

Mapping application 110 includes a feature extraction system 115, which is programmed or configured to extract features from aerial images or other raw digital map data of the electronic map source data 125 stored in the database 120. The feature extraction system 115 retrieves feature data from the electronic map data 130 stored in the database 120. The feature data may describe, e.g., instances of parking lots or other map features in an electronic map. The feature extraction system 115 trains a machine learning model based in part on the feature data from the electronic map data 130 stored in the database 120. The feature extraction system 115 uses the machine learning model to extract additional features from other aerial images, such as other raw digital map data stored in the electronic map source data 125. The feature extraction system 115 updates the electronic map data 130 with the extracted features. Additionally or alternatively, the feature extraction system 115 may include instructions to perform the process as detailed in FIG. 10.

A map editing program may be used to design a map to a user's specifications by allowing a user to select or upload map data, add custom fonts and images, or define and edit map styles, among other features. In an embodiment, a map editing program includes a map style editor creating custom map styles to a user's specifications. The map style editor may include a graphical user interface through which a user can define a custom map style or edit existing map styles.

Additionally or alternatively, the map style editor may include a visual map. The visual map may be displayed in conjunction with one or more map style layer properties. In an embodiment, the visual map is rendered based on the map style being edited in the map style editor. As changes are made to style layer properties, the visual map may be updated to reflect the changes. For example, if a user specifies a new width property value for roads, the map style editor may automatically re-display the visual map and render any roads shown within the map area using the new width property value. In some embodiments, the visual map incorporates data describing identified instances of a map feature, the data including a bounded geometry. The visual map including the identified instance of the map feature is provided to the client computing device 145 for display. The client computing device 145 displays the identified instance of the map feature based on the bounded geometry.

According to one embodiment, the techniques described herein are implemented by one or more special-purpose computing devices. For example, the server computer 105 and client computing device 145 may be computer devices configured as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 1B:
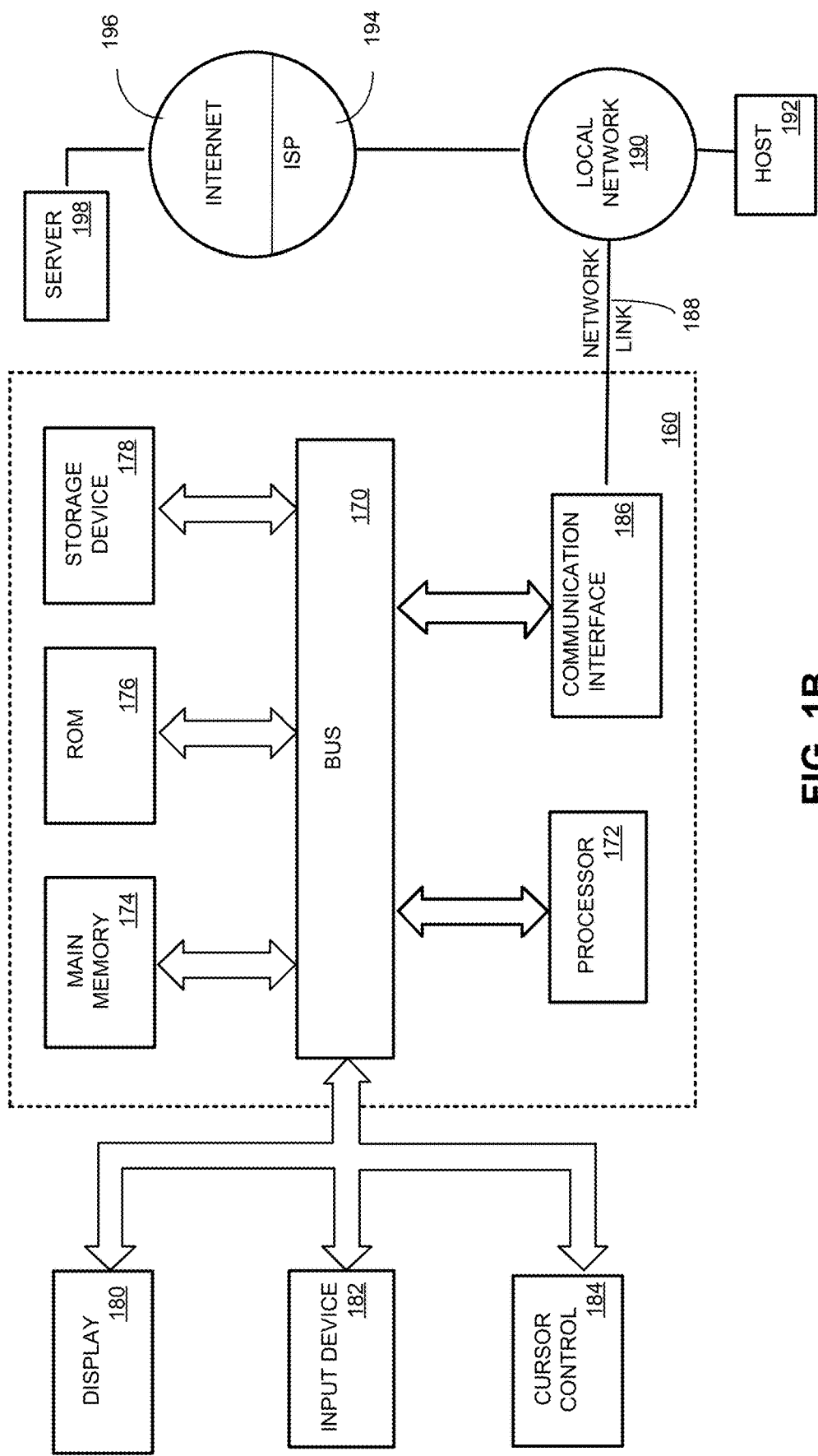
FIG. 1B illustrates a computer system upon which an embodiment may be implemented according to one or more embodiments.

For example, FIG. 1B is a block diagram that illustrates a computer system 160 upon which an embodiment of the invention may be implemented. Computer system 160 includes a bus 170 or other communication mechanism for communicating information, and a hardware processor 172 coupled with bus 170 for processing information. Hardware processor 172 may be, for example, a general purpose microprocessor.

Computer system 160 also includes a main memory 174, such as a random access memory (RAM) or other dynamic storage device, coupled to bus 170 for storing information and instructions to be executed by processor 172. Main memory 174 also may be used for storing temporary variables or other intermediate information during execution of instructions to be executed by processor 172. Such instructions, when stored in non-transitory storage media accessible to processor 172, render computer system 160 into a special-purpose machine that is customized to perform the operations specified in the instructions.

Computer system 160 further includes a read only memory (ROM) 176 or other static storage device coupled to bus 170 for storing static information and instructions for processor 172. A storage device 178, such as a magnetic disk, optical disk, or solid-state drive is provided and coupled to bus 170 for storing information and instructions.

Computer system 160 may be coupled via bus 170 to a display 180, such as a cathode ray tube (CRT), LCD screen, LED screen, or touch screen, for displaying information to a computer user. An input device 182, which may include alphanumeric and other keys, buttons, a mouse, a touchscreen, or other input elements, is coupled to bus 170 for communicating information and command selections to processor 172. In some embodiments, the computer system 160 may also include a cursor control 184, such as a mouse, a trackball, or cursor direction keys for communicating direction information and command selections to processor 172 and for controlling cursor movement on display 180. The cursor control 184 typically has two degrees of freedom in two axes, a first axis (e.g., x) and a second axis (e.g., y), that allows the device to specify positions in a plane.

Computer system 160 may implement the techniques described herein using customized hard-wired logic, one or more ASICs or FPGAs, firmware and/or program logic which in combination with the computer system causes or programs computer system 160 to be a special-purpose machine. According to one embodiment, the techniques herein are performed by computer system 160 in response to processor 172 executing one or more sequences of one or more instructions contained in main memory 174. Such instructions may be read into main memory 174 from another storage medium, such as storage device 178. Execution of the sequences of instructions contained in main memory 174 causes processor 172 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 178. Volatile media includes dynamic memory, such as main memory 174. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 170. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to processor 172 for execution. For example, the instructions may initially be carried on a magnetic disk or solid-state drive of a remote computer. The remote computer can load the instructions into its dynamic memory and send the instructions over a telephone line using a modem. A modem local to computer system 160 can receive the data on the telephone line and use an infra-red transmitter to convert the data to an infra-red signal. An infra-red detector can receive the data carried in the infra-red signal and appropriate circuitry can place the data on bus 170. Bus 170 carries the data to main memory 174, from which processor 172 retrieves and executes the instructions. The instructions received by main memory 174 may optionally be stored on storage device 178 either before or after execution by processor 172.

Computer system 160 also includes a communication interface 186 coupled to bus 170. Communication interface 186 provides a two-way data communication coupling to a network link 188 that is connected to a local network 190. For example, communication interface 186 may be an integrated services digital network (ISDN) card, cable modem, satellite modem, or a modem to provide a data communication connection to a corresponding type of telephone line. As another example, communication interface 186 may be a local area network (LAN) card to provide a data communication connection to a compatible LAN. Wireless links may also be implemented. In any such implementation, communication interface 186 sends and receives electrical, electromagnetic or optical signals that carry digital data streams representing various types of information.

Network link 188 typically provides data communication through one or more networks to other data devices. For example, network link 188 may provide a connection through local network 190 to a host computer 192 or to data equipment operated by an Internet Service Provider (ISP) 194. ISP 194 in turn provides data communication services through the world wide packet data communication network now commonly referred to as the "Internet" 196. Local network 190 and Internet 196 both use electrical, electromagnetic or optical signals that carry digital data streams. The signals through the various networks and the signals on network link 188 and through communication interface 186, which carry the digital data to and from computer system 160, are example forms of transmission media.

Computer system 160 can send messages and receive data, including program code, through the network(s), network link 188 and communication interface 186. In the Internet example, a server 198 might transmit a requested code for an application program through Internet 196, ISP 194, local network 190 and communication interface 186.

The received code may be executed by processor 172 as it is received, and/or stored in storage device 178, or other non-volatile storage for later execution.

Figure 2:
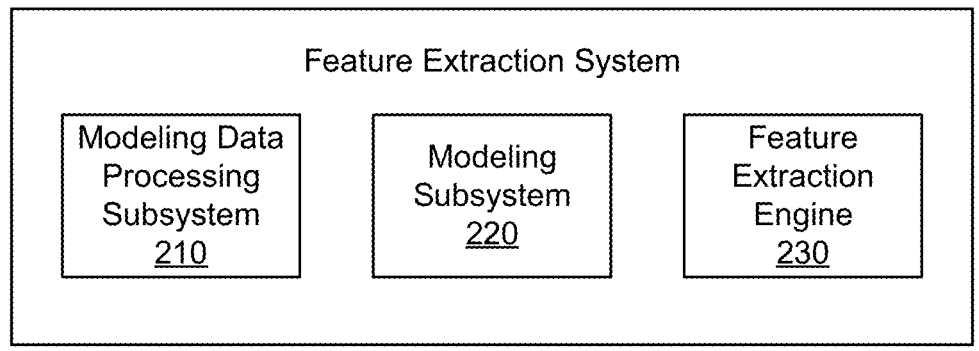
FIG. 2 is a block diagram of the feature extraction system of FIG. 1A according to one or more embodiments.

FIG. 2 illustrates the feature extraction system 115 of FIG. 1A according to one or more embodiments. The feature extraction system 115 extracts map features from aerial images using a trained machine learned model. The feature extraction system 115 may develop several models trained to extract different types of map features, e.g., one model trained to extract parking lots, another model trained to identify clouds, and other model trained to identify parks, etc. In the example illustrated by FIG. 2, the feature extraction system 115 includes a modeling data processing subsystem 210, a modeling subsystem 220, and a feature extraction engine 230. In other embodiments, the feature extraction system 115 contains different and/or additional elements. In addition, the functions may be distributed among the elements in a different manner than described.

The modeling data processing subsystem 210 generates a modeling dataset used to train a machine learning model for extracting features from aerial images. The modeling data processing subsystem 210 may generate a modeling dataset for a particular type of map feature, e.g., parking lots. The modeling data set includes aerial images paired with corresponding mask images indicating locations and boundaries of known instances of the map feature.

To obtain the mask images with the known instances of the map feature, the modeling data processing subsystem 210 accesses tiled map data from the electronic map data 130. For the particular map feature, the modeling data processing subsystem 210 identifies instances of the map feature in the tiled map data and selects a subset of tiles that include the identified instances of the map feature. The modeling data processing subsystem 210 rasterizes each tile in the subset to generate a mask image for the tile. To obtain the aerial images corresponding to the mask images, the modeling data processing subsystem 210 identifies georeference data describing a geographic area represented by each tile in the subset. The modeling data processing subsystem 210 then retrieves an aerial image corresponding to the tile based on the georeferenced data from the electronic map source data 125, and pairs the aerial image with the corresponding mask image. The modeling data processing subsystem 210 is described in further detail with reference to FIG. 3 below.

The modeling subsystem 220 is configured to train the machine learning model for extracting features from aerial images based on the modeling dataset. In some embodiments, the machine learning model is a convolution neural network. The modeling subsystem 220 trains the machine learned model and predicts, for a given aerial image, whether each pixel of the aerial image corresponds to the map feature for which the model is trained. For example, one machine learned model is trained based on images of parking lots to receive an aerial image and predict a probability that each pixel in the aerial image corresponds to a parking lot. To train the model, the modeling subsystem 220 segments the modeling dataset generated by the modeling data processing subsystem 210 into segments used for different stages of the modeling process, e.g., training, validation, and evaluation of the model. For example, the modeling subsystem 220 trains the convolution neural network based on the training set, calculates a set of validation metrics for the convolution neural network based on the validation set, updates the convolution neural network based on the validation metrics, and evaluates the convolution neural network based on the evaluation set. The modeling subsystem 220 is described in further detail with reference to FIG. 4 below.

The feature extraction engine 230 uses the machine learning model trained by the modeling subsystem 220 to extract map features from an aerial image. The machine learned model receives an aerial image and predicts a probability that each pixel of the aerial image corresponds to the map feature for which the model has been trained. The feature extraction engine 230 generates a mask based on these probabilities. If the aerial image includes the map feature, the mask has at least one region including the pixels with high probabilities. The feature extraction engine 230 removes noise in the mask to determine a simplified shape for the at least one region, and determines a contour surrounding the simplified shape of the at least one region, the contour defining a bounded geometry for the extracted feature. In some embodiments, data including the bounded geometry is incorporated into the electronic map 130 and the electronic map is provided to a client computing device 145 for display. The feature extraction engine 230 is described in further detail with reference to FIG. 5 below.

Figure 3:
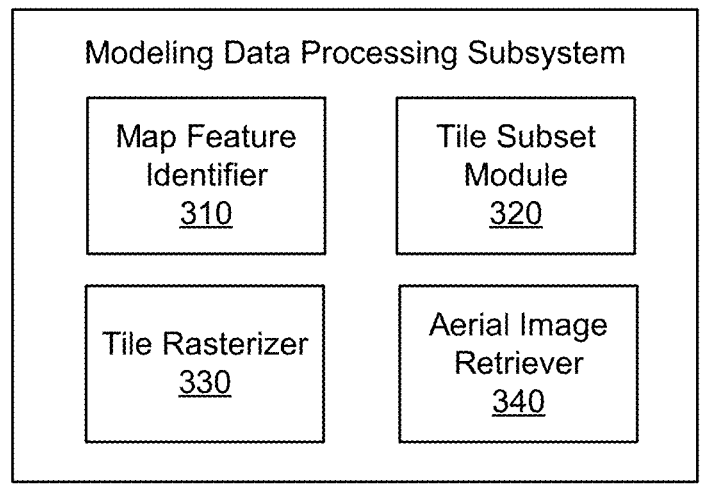
FIG. 3 is a block diagram of a modeling data processing subsystem according to one or more embodiments.

FIG. 3 is a block diagram of a modeling data processing subsystem 210 according to one or more embodiments. In the example illustrated by FIG. 3, the modeling data processing subsystem 210 includes a map feature identifier 310, a tile subset module 320, a tile rasterizer 330, and an aerial image retriever 340. In other embodiments, the modeling processing subsystem 210 contains different and/or additional elements. In addition, the functions may be distributed among the elements in a different manner than described.

The map feature identifier 310 accesses tiled map data from the electronic map data 130 stored in the database 120 of FIG. 1A. The tiled map data may include, e.g., a tiled web map, a slippy map, or a tile map. The tiled map data may follow certain conventions or standards including the size of tiles, the numbering of zoom levels, the projection to use, the way individual tiles are numbered or otherwise identified, the method for requesting them, and the like. The map feature identifier 310 identifies instances of a map feature in the accessed tiled map data, e.g., by searching the tiled map data for instances of a particular map feature (e.g., parking lots) in the tiled map data. For example, the map feature identifier 310 searches the features associated with each retrieved map tile for a field that identifies the particular feature type, and stores data identifying each feature having a field that matches the feature type and the tile (or tiles, if the feature spans multiple tiles) on which that feature is located. The map feature identifier 310 may access tiled map data at a particular zoom level or multiple zoom levels. The zoom level may be selected based on a typical size of the feature being modeled. For example, the map feature identifier 310 accesses tiled map data at one zoom level to identify instances of parking lots, and accesses tiled map data at a higher zoom level to identify instances of buildings.

The tile subset module 320 selects a subset of tiles that include the identified instances of the map feature in the tiled map data. The tile subset module 320 selects each tile having the particular map feature identified by the map feature identifier 310, or a subset of the tiles having the particular map feature that were identified by the map feature identifier 310. In some embodiments, the tile subset module 320 may select a particular number of tiles, e.g., 10,000 or 100,000 tiles, as the subset of tiles for modeling. Tiles that include the particular map feature are positive samples; in some embodiments, the tile subset module 320 also selects a set of negative samples, i.e., tiles that do not include the particular map feature. In some embodiments, the tile subset module 320 generates a list of identifiers associated with the subset of tiles.

The tile rasterizer 330 rasterizes each tile of the subset of tiles to generate a mask image for the tile. Rasterization involves taking a tile described in a vector graphics format (e.g., SVS, EPS, or PDF) and converting the tile into a raster image. A raster image is an image having a dot matrix structure that represents a grid of pixels. The rasterized image may be stored in a bitmap file format (e.g., PNG or JPG). In some embodiments, each tile of the subset of tiles is already stored in raster format (e.g., a bitmap file such as PNG or JPG) so rasterization is not necessary.

In some embodiments, the tile rasterizer 330 includes a border around each of the tiled mask images. For example, each tile selected by the subset module has a main target area surrounded by a border, which encompasses portions of adjacent tiles. The tile rasterizer 330 generates the rasterized mask image to include both the target area and the border. When the borders are added to the tiles, two adjacent tiles have a partial overlap in the regions that they cover. The borders may be included in the original vector tiles, i.e., the tiled map data is comprised of tiles with borders such that the two adjacent vector tiles include a partial overlap. For example, the target area of a rasterized tile corresponds to the portion of a vector tile that is displayed when a set of adjacent tiles are displayed by an electronic map application. If the vector tiles do not include borders, the tile rasterizer 330 may add borders based on data from adjacent vector tiles to each tile being rasterized, and then rasterize each modified tile, including its border.

The aerial image retriever 340 identifies geo-reference data describing a geographic area represented by a tile of the subset of tiles and retrieves a modeling aerial image corresponding to each tile based on the geo-reference data. The tiled map data includes, for each tile, geo-reference data describing the geographic area represented by each tile. For example, the tiled map data includes, for each tile, latitude and longitude information for at least one point in the tile. The geo-reference data may describe the geographic boundaries of each tile, or may be used to derive the geographic boundaries of each tile. The aerial image retriever 340 retrieves the geo-reference data for each tile in the subset, and based on the geo-reference data, the aerial image retriever 340 retrieves a respective aerial image that corresponds to the same geographic area as each tile in the subset. The retrieved aerial images may be referred to as modeling aerial images; modeling aerial images are aerial images that are included in a modeling dataset for training the machine learning model. The aerial image retriever 340 generates pairs of modeling aerial images and corresponding mask images. Each pair includes the retrieved modeling aerial image by the aerial image retriever 340 and the mask image generated for the tile by the tile rasterizer 330. These pairs of modeling aerial images and mask images for the modeling dataset used to train the machine learning model.

In some embodiments, the modeling aerial images are segmented into rectangular tiles of the same size and zoom level as the mask images before being paired. For example, some aerial images are large in size, encompassing a wider area as map tiles for the same zoom level. Such aerial images are segmented into smaller, more manageable aerial image tiles for processing. In general, by using smaller tile sizes for the mask and aerial images, the feature extraction system 115 will need less memory to decode the image. Each aerial image tile covers a region corresponding to the same region described by the mask image. As with the mask images, the aerial image retriever 340 may add a border around each aerial image tile that includes portions of adjacent aerial image tiles. As with the mask images, if the aerial images include borders, adjacent aerial images include at least a partial overlap in the region that they cover.

Figure 4:
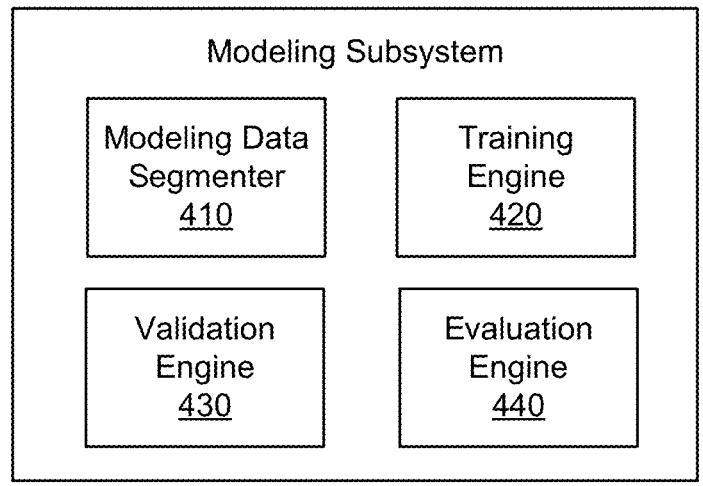
FIG. 4 is a block diagram of a modeling subsystem according to one or more embodiments.

FIG. 4 is a block diagram of a modeling subsystem 220 according to one or more embodiments. In the example illustrated by FIG. 4, the modeling subsystem 220 includes a modeling data segmenter 410, a training engine 420, a validation engine 430, and an evaluation engine 440. In other embodiments, the modeling subsystem 220 contains different and/or additional elements. In addition, the functions may be distributed among the elements in a different manner than described.

The modeling data segmenter 410 segments the modeling dataset into a training set of modeling aerial images and corresponding mask images, a validation set of modeling aerial images and corresponding mask images, and an evaluation set of modeling aerial images and corresponding mask images. Each of these sets is used for a different stage of the modeling process: model training, model validation, and model evaluation. For example, if the modeling dataset includes 100,000 pairs of modeling aerial images and mask images, the modeling data segmenter 410 randomly selects 50,000 pairs for the training set; randomly selects 25,000 of the remaining pairs for the validation set; and assigns the remaining 25,000 pairs to the validation set. In another example, the modeling data segmenter 410 randomly selects 75,000 pairs for the training set and assigns the remaining 25,000 pairs to both the validation set and the evaluation set. In some embodiments, the modeling data segmenter 410 samples pairs for each set such that the pairs span various classes that the machine learning model would face when used in the real world. For example, the sampled pairs for each set include each of a variety of built features (roads, buildings, etc.) and geological features (rivers, lakes, etc.).

The modeling data segmenter 410 may divide the modeling dataset in different proportions. In some embodiments, the modeling data segmenter 410 randomly selects each of the training set, validation set, and evaluation set from the full modeling dataset, so that a given pair may be assigned to more than one of the sets (e.g., a given pair is assigned to both the training set and the validation set). In some embodiments, the training set, the validation set, and the evaluation set are substantially similar to each other such that they contain the same pairs of images and/or the same number of pairs of images. For example, the modeling data segmenter 410 divides the modeling dataset in equal proportions, so the training set, the validation set, and the evaluation set have the same number of pairs of images. In some other embodiments, the training set, the validation set, and the evaluation set contain different pairs of images and/or a different number of pairs of images. For example, as described above, the modeling data segmenter 410 divides the modeling dataset in different proportions such that the training set, the validation set, and the evaluation set are in order of decreasing proportion.

The training engine 420 trains the machine learning model based on the training set. The training engine 420 trains the machine learning model to determine a probability that a pixel of the aerial image corresponds to particular map feature. In some embodiments, the determined probability for a pixel is based in part on shapes surrounding the pixel. In such embodiments, including a border around a target area for a tile can improve the accuracy of the probabilities within the target area determined by the machine learning model. The machine learning model may be, e.g., a convolution neural network (CNN), a deep neural network (DNN), or a recurrent neural network (RNN). In some embodiments, the training engine 420 trains the machine learning model using one or more graphics processing units (GPUs) (e.g., AWS p2/p3, NVIDIA GTX 1080 TI, etc.). As described above, the training set includes pairs of modeling aerial images and corresponding mask images. The training set may include, e.g., 10,000-100,000 pairs of images. The training set is used to fit parameters (e.g., weights of connections between neurons in artificial neural networks) of the machine learning model. The training engine 420 trains the machine learning model on the training set using a supervised learning method (e.g., gradient descent). During training, the machine learning model produces a result (e.g., a set of predicted probabilities for an aerial image), which is then compared with corresponding feature data for a mask image in the training set. Based on the result of the comparison and the learning algorithm being used, the parameters of the model are adjusted.

The validation engine 430 calculates a set of validation metrics for the machine learning model based on the validation set. As described above, the validation set includes pairs of modeling aerial images and corresponding mask images. The validation engine 430 then updates the machine learning model based on the validation metrics. For example, the validation engine 430 uses the machine learning model trained by the training engine 420 to predict the pixel probabilities for aerial images in the validation set, and compares the predicted pixel probabilities to the paired mask images. The validation set provides an evaluation of the model fit based on the training set, and enables further tuning the model's parameters (e.g., the number of hidden units in a neural network, and/or the weights of the units in the neural network). The validation set may be used for regularization by early stopping which stops the training engine 420 from training when error on the validation set increases. Early stopping is used to avoid overfitting when training. The validation and training process updates the machine learning model to make it a better fit with the training and validation sets with each iteration. Early stopping regulates how many iterations can be run before the machine learning model begins to overfit.

The evaluation engine 440 evaluates the machine learning model based on the evaluation set to confirm that the machine learning model is properly trained. As described above, the evaluation set includes pairs of modeling aerial images and corresponding mask images. The evaluation engine 440 is used after the machine learning model is trained by the training engine 420 and validated by the validation engine 430. The evaluation set may be used to evaluate multiple competing models generated using the training engine 420 and the validation engine 430. The evaluation set may be curated to include sampled data that spans various classes that the machine learning model would face when used in the real world.

Figure 5:
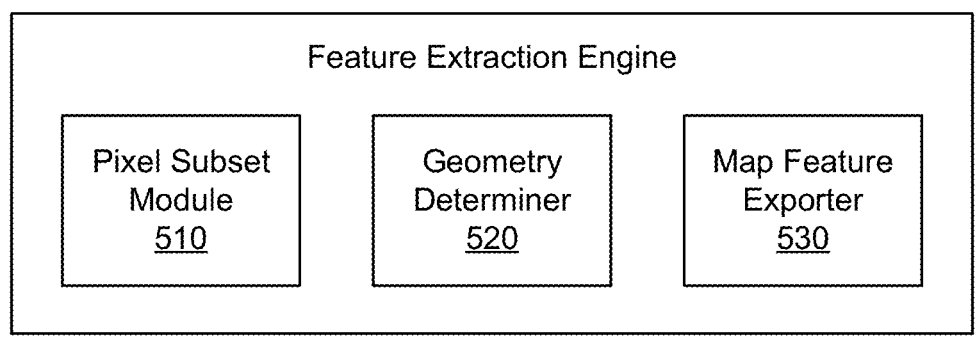
FIG. 5 is a block diagram of a feature extraction engine according to one or more embodiments.

FIG. 5 is a block diagram of a feature extraction engine 230 according to one or more embodiments. In the example illustrated by FIG. 5, the feature extraction engine 230 includes a pixel subset module 510, a geometry determiner 520, and a map feature exporter 530. In other embodiments, the feature extraction engine 230 contains different and/or additional elements. In addition, the functions may be distributed among the elements in a different manner than described.

The pixel subset module 510 receives an aerial image. For example, the pixel subset module 510 receives the aerial image from the electronic map source data 125 stored in the database 120 of FIG. 1. The pixel subset module 510 uses the machine learning module to predict a probability that each pixel of the aerial image corresponds to the map feature (e.g., parking lots) for which the machine learning model has been trained. The received aerial image may include a plurality of aerial image tiles, each of which is separately processed by the pixel subset module 510. As discussed with respect to FIG. 4, the aerial image tiles may each include a border, and the machine learning model determines probabilities for the target area of each aerial image tile.

The pixel subset module 510 identifies a subset of pixels of the plurality of pixels of the aerial image based on the predicted probabilities. Each pixel in the subset of pixels has a predicted probability that is greater than or equal to a threshold probability that a pixel corresponds to the map feature. The threshold probability may be a predetermined threshold probability, e.g., 50%, 80%, or 90%. The pixel subset module 510 may identify subsets of pixels within each aerial image tile.

The geometry determiner 520 determines one or more bounded geometries or polygons, each enclosing at least a portion of the subset of pixels identified by the pixel subset module 510. A bounded geometry encompasses an identified instance of the map feature. As described above, each pixel in the subset of pixels has a predicted probability that is greater than or equal to a threshold probability that a pixel corresponds to the map feature. The geometry determiner 520 determines a bounded geometry for each of the aerial image tiles. In some embodiments, a map feature spans multiple aerial image tiles. If bounded geometries in adjacent tiles meet at one or more edges between two or more adjacent tiles, the geometry determiner combines the bounded geometries into a single bounded geometry that spans across the adjacent tiles. This process is described below in detail with reference to FIGS. 7-9.

The geometry determiner 520 generates a mask having at least one region including the identified subset of pixels. The geometry determiner 520 removes noise in the mask to determine a simplified shape for the at least one region and determines a contour surrounding the simplified shape. In some embodiments, the geometry determiner 520 further processes the mask to fill in small holes, handle nested bounded geometries, and simplify the shapes, e.g., using the Ramer-Douglas-Peucker algorithm.

The map feature exporter 530 updates electronic map data with the extracted features. For example, the map feature exporter 530 updates electronic map data 130 to include the polygons of the extracted features determined by the geometry determiner 520. Each polygon encompasses an identified instance of a parking lot or another map feature. In some embodiments, the map feature exporter 530 updates the electronic map data 130 to further include an identifier associated with the feature, georeferenced data indicating a location of the feature, information for how to render the feature, and the like. The updated electronic map data may be used by the client map application 150 and/or the mapping application 110. For example, the client map application 150, which displays a map based on the electronic map data 130, displays one or more extracted features to a user of the client computing device 145.

In some embodiments, the map feature exporter 530 compares each extracted map feature to map features already present in the electronic map data 130. If an extracted map feature is already present in the electronic map data 130, the map feature exporter 530 may filter the extracted map feature and not update the electronic map data 130 with a duplicative feature. In some embodiments, the map feature exporter 530 compares data describing the duplicative extracted feature to the corresponding information in the electronic map data 130 and updates the electronic map data 130 based on the extracted information, e.g., by updating the feature boundary, adding a feature label etc.

In some embodiments, a manual check is performed on the labelled map feature before an extracted map feature is added to an electronic map. The detection of potential map features using the feature extraction system 115 in combination with a manual check of an automatically identified feature is significantly faster and more accurate than a solely manual review aerial images to identify previously unlabeled map features.

Figure 6:
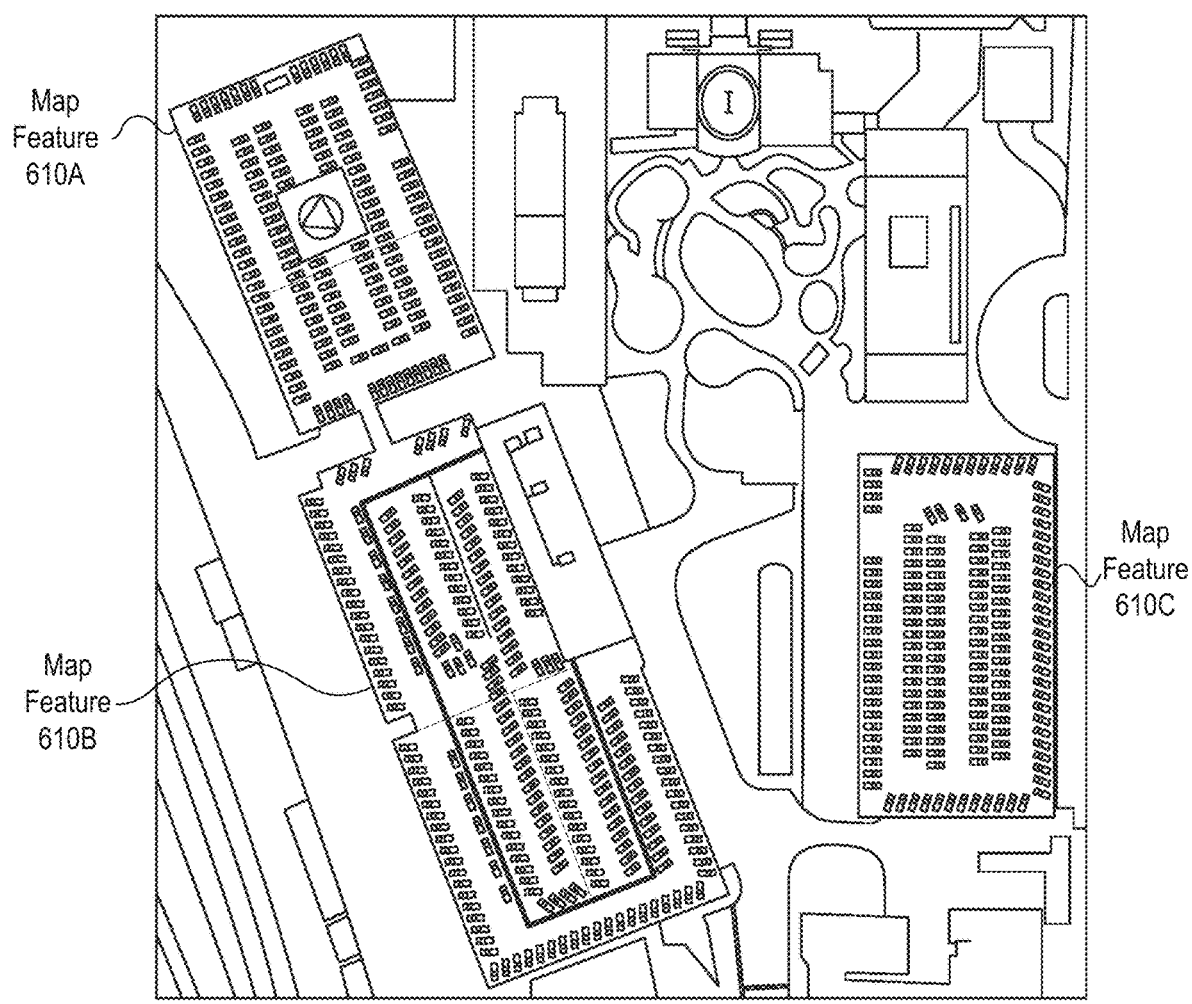
FIG. 6 is an example of an aerial image according to one or more embodiments.

FIG. 6 is an example of an aerial image 600 according to one or more embodiments. The feature extraction system 115 retrieves the aerial image 600 from the electronic map source data 125 in the database 120. The aerial image 600 includes a plurality of pixels (not shown in FIG. 6) and a plurality of map features 610A, 610B, and 610C. In the example illustrated by FIG. 6, the map features 610A, 610B, and 610C are instances of parking lots. The feature extraction system 115 is programmed to extract the map features 610A, 610B, 610C from the aerial image 600. The feature extraction system 115 may split the aerial image 600 into multiple tiles for processing.

Figure 7:
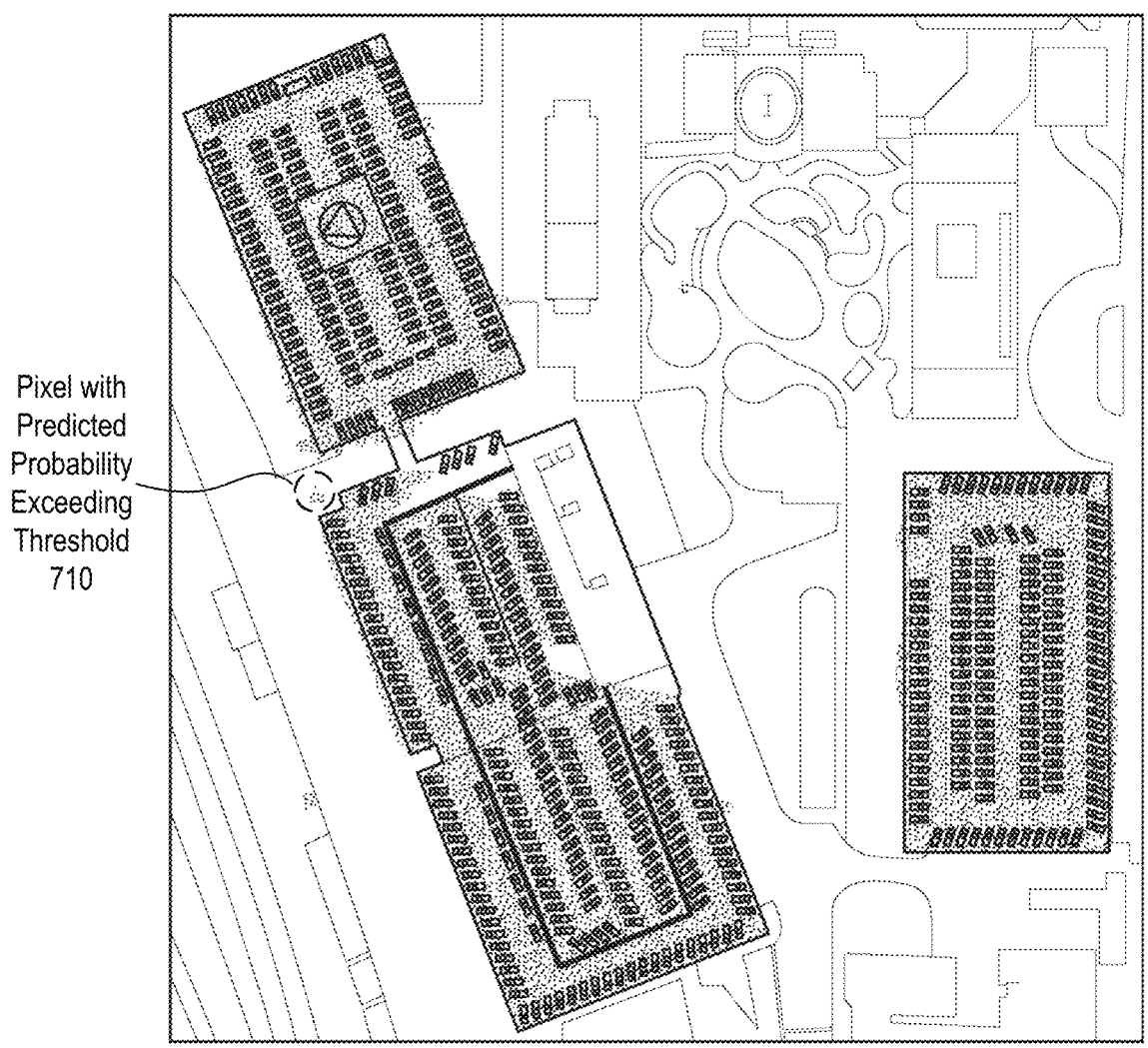
FIG. 7 illustrates an aerial image with predicted probabilities of pixels exceeding a threshold according to one or more embodiments.

FIG. 7 illustrates an aerial image 700 with predicted probabilities of pixels exceeding a threshold according to one or more embodiments. The feature extraction system 115 uses the machine learning model trained by the training engine 420 to predict a probability that each pixel of the aerial image 700 corresponds to a particular map feature. For example, the pixel subset module 510 predicts a probability that each pixel of the aerial image 700 corresponds to a parking lot using a machine learning model trained to identify pixels that correspond to parking lots.

In the example illustrated by FIG. 7, a portion of pixels having a predicted probability exceeding a threshold 710 are depicted by small black dots over the aerial image 700. The pixels with a predicted probability exceeding a threshold 710, and the other pixels depicted with black dots, are the subset of pixels identified by the pixel subset module 510. For example, if the threshold probability is 50%, the pixels with predicted probability exceeding a threshold 710 have a predicted probability greater than or equal to 50%. The other pixels in the aerial image 700 that are not marked by black dots have predicted probabilities less than 50%.

Figure 8:
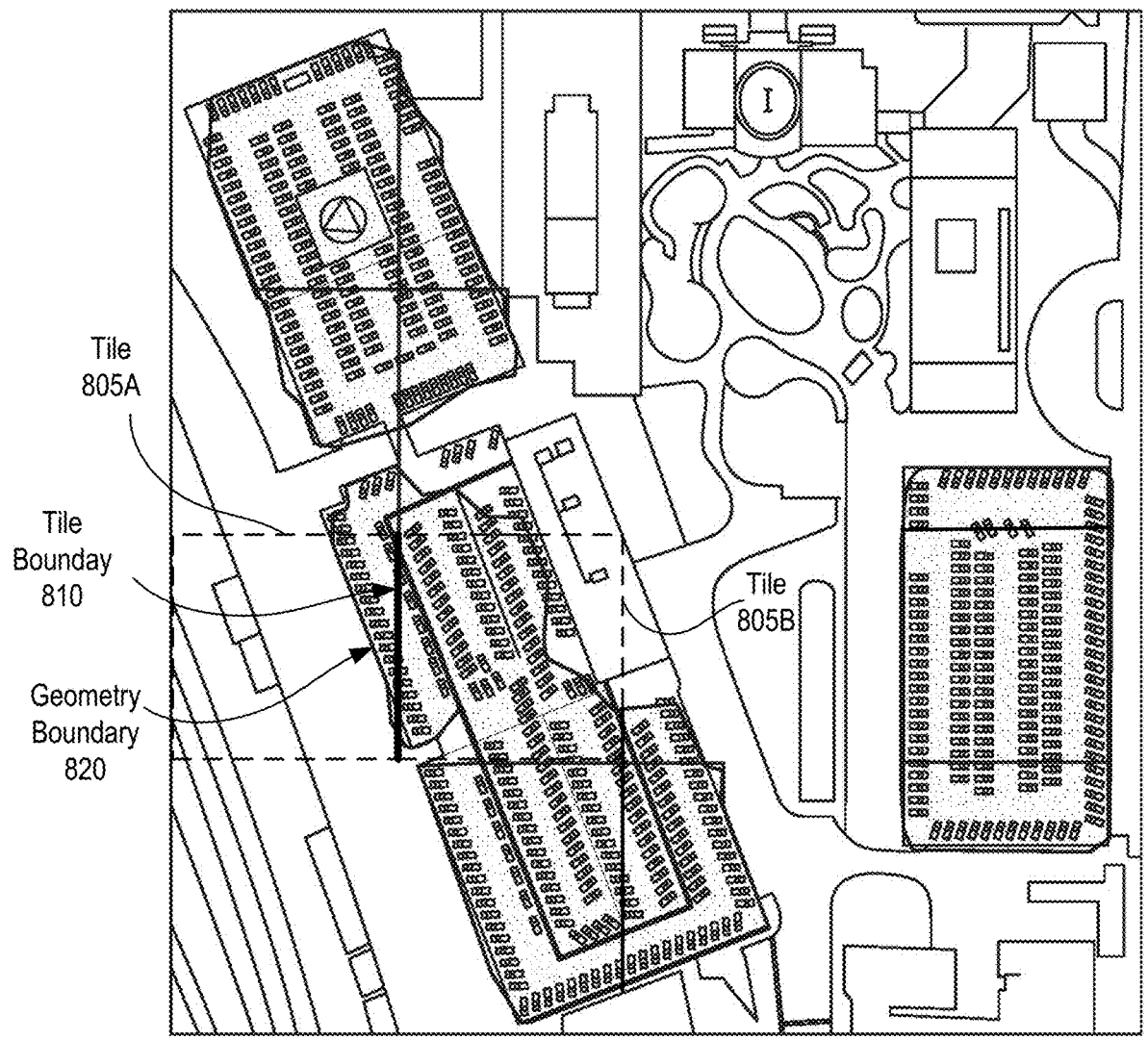
FIG. 8 illustrates an aerial image with feature boundaries determined at a per-tile level, according to one or more embodiments.

FIG. 8 illustrates an aerial image 800 with feature boundaries determined at a per-tile level, according to one or more embodiments. As described above, the aerial image 600 may be segmented into a number of smaller rectangular tiles, which were input into the machine learning model. The aerial image 800 shows the determined bounded geometries determined at a per-tile level, along with tile boundaries that separate adjacent bounded geometries. In the example illustrated by FIG. 8, the aerial image 800 includes tiles 805A and 805B, which are demarcated in FIG. 8 using dashed boxes. The aerial image 800 further includes a tile boundary 820, demarcated with a thicker line, that separates tiles 805A and 805B.

The geometry determiner 520 determines a bounded geometry or polygon enclosing at least a portion of the subset of pixels identified by the pixel subset module 510 at a per-tile level. In particular, the geometry determiner 520 determines various bounded geometries enclosing the above-threshold probability pixels shown in FIG. 7. One of the bounded geometries encloses the portion of the subset of pixels in tile 805A. This bounded geometry has a geometry boundary 820. The bounded geometry is also bounded by borders with adjacent tiles, e.g., the tile boundary 810 between tiles 805A and 805B. In some embodiments, the geometry determiner 520 sequentially determines bounded geometries for each tile. Alternatively, the geometry determiner 520 simultaneously determines bounded geometries for two or more tiles in parallel.

Figure 9:
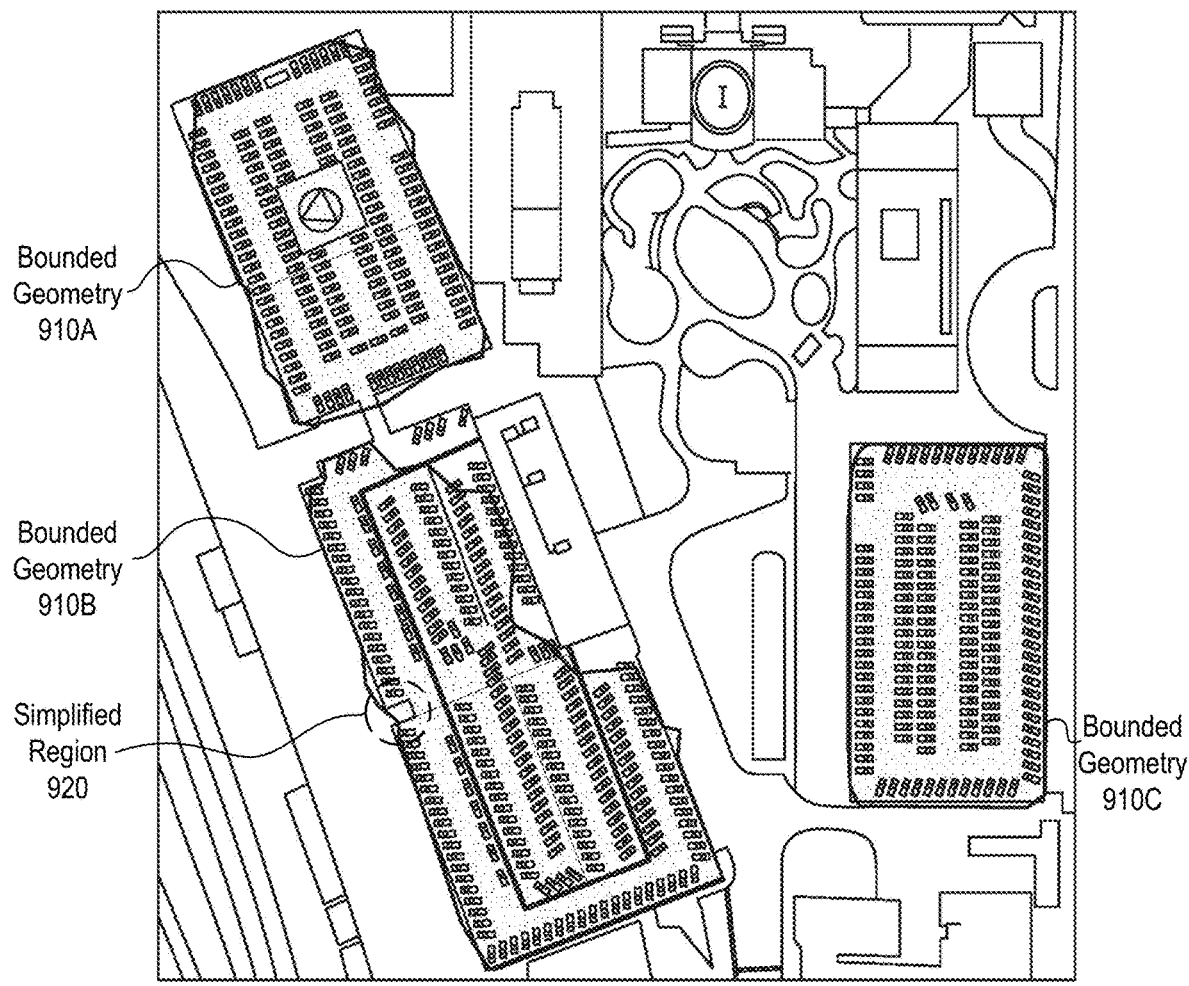
FIG. 9 illustrates an aerial image with merged feature boundaries according to one or more embodiments.

FIG. 9 illustrates an aerial image 900 with merged feature boundaries according to one or more embodiments. The aerial image 900 includes a plurality of bounded geometries 910A, 910B, 910C, each surrounded by a contour. Each of the bounded geometries 910A, 910B, 910C encompasses an identified instance of the map feature, in this case, a parking lot. For example, the bounded geometries 910A, 910B, 910C correspond to the map features 610A, 610B, 610C in FIG. 6, respectively. Referring back to FIG. 8, the bounded geometries in the various tiles, e.g., the bounded geometries in 805A and 805B, and other bounded geometries spanning multiple tiles are merged, since the bounded geometries correspond to the same feature. Each of the bounded geometries 910A, 910B, 910C in FIG. 9 spans multiple tiles to form full bounded geometries for the parking lots.

In merging bounded geometries across tiles, the geometry determiner 520 simplifies the edges of the boundaries at the tile borders. For example, the simplified region 920 in FIG. 9 includes a portion of a boundary that is simplified relative to the geometry boundaries for the individual tiles, as shown in FIG. 8. The geometry determiner 520 may determine simplified geometries for each map feature first at a per-tile level and then at a merged, cross-tile level.

Figure 10:
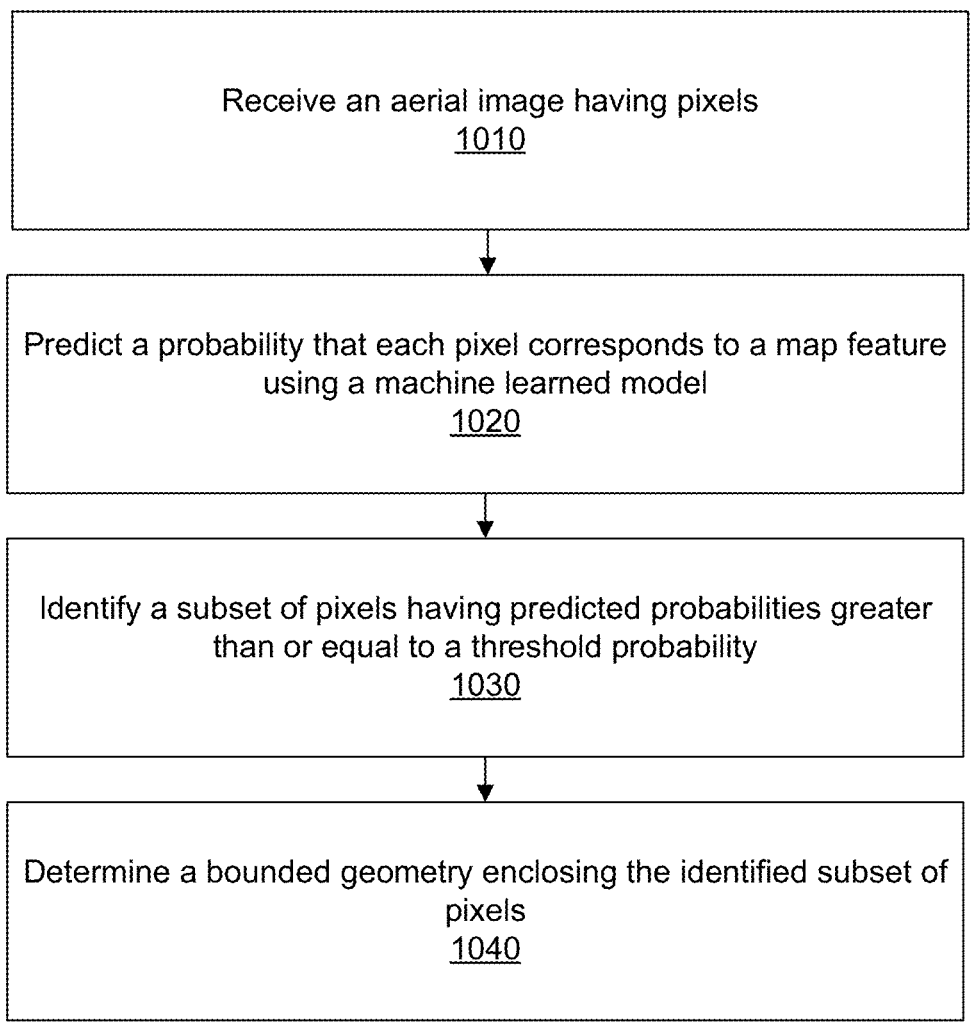
FIG. 10 illustrates a flowchart of a process extracting map features from an aerial image, according to one or more embodiments.

FIG. 10 illustrates a flowchart of a process extracting map features from an aerial image, according to one or more embodiments. In various embodiments, the operations of the process 1000 of FIG. 10 may be implemented in programming by a server computer 105 or its components as described herein. For example, the operations of the process 1000 may be performed by the feature extraction system 115. Additionally or alternatively, the server computer 105 may perform aspects of the functions described below using special-purpose hardware. In some embodiments, one or more functions described below may be performed by the mobile computing device 145.

The server computer 105 executing the mapping application 110 receives 1010 an aerial image having pixels. For example, the feature extraction module 115 receives an aerial image from the electronic map source data 125 stored in database 120.

The server computer 105 executing the mapping application 110 predicts 1020 a probability that each pixel corresponds to a map feature using a machine learned model. The machine learned model is trained to identify map features in an aerial image. The training engine 420 trains the machine learned model on a modeling dataset, described with respect to FIG. 4. In some embodiments, the machine learned model is a convolution neural network.

The server computer 105 executing the mapping application 110 identifies 1030 a subset of pixels having predicted probabilities greater than or equal to a threshold probability. The threshold probability is a probability that a pixel corresponds to the map feature.

The server computer 105 executing the mapping application 110 determines 1040 a bounded geometry enclosing the identified subset of pixels. The map feature including the bounded geometry may then be added to the electronic map data 130.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method for extracting map features from an aerial image, the method comprising:
receiving an aerial image comprising a plurality of pixels;
predicting, for each pixel of the plurality of pixels, a probability that the pixel corresponds to a map feature based on a machine learned model comprising a convolutional neural network, the model trained to determine a probability that a pixel corresponds to the map feature based on a modeling dataset comprising pairs of modeling aerial images and corresponding mask images, each mask image in a pair describing a known instance of the map feature, wherein training the model comprises:
segmenting the modeling dataset into a training set of modeling aerial images and corresponding mask images, a validation set of modeling aerial images and corresponding mask images, and an evaluation set of modeling aerial images and corresponding mask images;
training the convolutional neural network based on the training set;
calculating a set of validation metrics for the convolutional neural network based on the validation set;
updating the convolutional neural network based on the validation metrics; and
evaluating the convolutional neural network based on the evaluation set;
identifying a subset of pixels of the plurality of pixels, each pixel in the subset having a predicted probability that is greater than or equal to a threshold probability that a pixel corresponds to the map feature; and
determining a bounded geometry enclosing at least a portion of the identified subset of pixels, the bounded geometry encompassing an identified instance of the map feature.

2. The data processing method of claim 1, further comprising:
accessing a tiled map comprising a plurality of tiles, each tile comprising a plurality of pixels;
identifying instances of the map feature in the tiled map;
selecting a subset of tiles of the plurality of tiles, the selected subset of tiles corresponding to the identified instances of the map feature in the tiled map; and
rasterizing each tile of the subset of tiles to generate a mask image for the tile.

3. The data processing method of claim 2, further comprising, for each tile of the subset of tiles:
identifying geo-reference data describing a geographic area represented by the tile;
retrieving a modeling aerial image corresponding to the tile based on the geo-reference data; and
generating a pair of modeling aerial image and corresponding mask image, the pair comprising the retrieved modeling aerial image and the mask image generated for the tile.

4. The data processing method of claim 1, further comprising:
incorporating data describing the identified instance of the map feature into an electronic map, the data comprising the bounded geometry; and
providing the electronic map comprising the identified instance of the map feature to a device for display, wherein the device is configured to display the identified instance of the map feature based on the bounded geometry.

5. The data processing method of claim 1, wherein the map feature is one of a building, a parking lot, a road, a body of water, and a cloud.

6. The data processing method of claim 1, wherein determining a bounded geometry enclosing at least a portion of the identified subset of pixels comprises:
generating a mask having at least one region comprising the identified subset of pixels;
removing noise in the mask to determine a simplified shape for the at least one region; and
determining a contour surrounding the simplified shape of the at least one region, the contour defining the bounded geometry.

7. A non-transitory computer readable storage medium configured to store program code, the program code comprising instructions that, when executed by one or more processors, cause the one or more processors to:
receive an aerial image comprising a plurality of pixels;
predict, for each pixel of the plurality of pixels, a probability that the pixel corresponds to a map feature based on a machine learned model comprising a convolutional neural network, the model trained to determine a probability that a pixel corresponds to the map feature based on a modeling dataset comprising pairs of modeling aerial images and corresponding mask images, each mask image in a pair describing a known instance of the map feature, wherein training the model comprises:
segmenting the modeling dataset into a training set of modeling aerial images and corresponding mask images, a validation set of modeling aerial images and corresponding mask images, and an evaluation set of modeling aerial images and corresponding mask images;
training the convolutional neural network based on the training set;
calculating a set of validation metrics for the convolutional neural network based on the validation set;
updating the convolutional neural network based on the validation metrics; and
evaluating the convolutional neural network based on the evaluation set;
identify a subset of pixels of the plurality of pixels, each pixel in the subset having a predicted probability that is greater than or equal to a threshold probability that a pixel corresponds to the map feature; and
determine a bounded geometry enclosing at least a portion of the identified subset of pixels, the bounded geometry encompassing an identified instance of the map feature.

8. The non-transitory computer readable storage medium of claim 7, further comprising instructions to:
access a tiled map comprising a plurality of tiles, each tile comprising a plurality of pixels;
identify instances of the map feature in the tiled map;
select a subset of tiles of the plurality of tiles, the selected subset of tiles corresponding to the identified instances of the map feature in the tiled map; and
rasterize each tile of the subset of tiles to generate a mask image for the tile.

9. The non-transitory computer readable storage medium of claim 8, further comprising instructions to, for each tile of the subset of tiles:
identify geo-reference data describing a geographic area represented by the tile;

retrieve a modeling aerial image corresponding to the tile based on the geo-reference data; and generate a pair of modeling aerial image and corresponding mask image, the pair comprising the retrieved modeling aerial image and the mask image generated for the tile.

10. The non-transitory computer readable storage medium of claim 7, further comprising instructions to:

incorporate data describing the identified instance of the map feature into an electronic map, the data comprising the bounded geometry; and provide the electronic map comprising the identified instance of the map feature to a device for display, wherein the device is configured to display the identified instance of the map feature based on the bounded geometry.

11. The non-transitory computer readable storage medium of claim 7, wherein the map feature is one of a building, a parking lot, a road, a body of water, and a cloud.

12. The non-transitory computer readable storage medium of claim 7, wherein the instructions to determine a bounded geometry enclosing at least a portion of the identified subset of pixels comprise instructions to:

generate a mask having at least one region comprising the identified subset of pixels;

remove noise in the mask to determine a simplified shape for the at least one region; and determine a contour surrounding the simplified shape of the at least one region, the contour defining the bounded geometry.

13. A system comprising a computer processor for executing computer program instructions, and a non-transitory computer-readable storage medium storing computer program instructions executable by the processor to perform operations comprising:

receiving an aerial image comprising a plurality of pixels;

predicting, for each pixel of the plurality of pixels, a probability that the pixel corresponds to a map feature based on a machine learned model comprising a convolutional neural network, the model trained to determine a probability that a pixel corresponds to the map feature based on a modeling dataset comprising pairs of modeling aerial images and corresponding mask images, each mask image in a pair describing a known instance of the map feature, wherein training the model comprises:

segmenting the modeling dataset into a training set of modeling aerial images and corresponding mask images, a validation set of modeling aerial images and corresponding mask images, and an evaluation set of modeling aerial images and corresponding mask images;

training the convolutional neural network based on the training set;

calculating a set of validation metrics for the convolutional neural network based on the validation set;

updating the convolutional neural network based on the validation metrics; and evaluating the convolutional neural network based on the evaluation set;

identifying a subset of pixels of the plurality of pixels, each pixel in the subset having a predicted probability that is greater than or equal to a threshold probability that a pixel corresponds to the map feature; and determining a bounded geometry enclosing at least a portion of the identified subset of pixels, the bounded geometry encompassing an identified instance of the map feature.

14. The system of claim 13, the operations further comprising:

accessing a tiled map comprising a plurality of tiles, each tile comprising a plurality of pixels;

identifying instances of the map feature in the tiled map;

selecting a subset of tiles of the plurality of tiles, the selected subset of tiles corresponding to the identified instances of the map feature in the tiled map; and rasterizing each tile of the subset of tiles to generate a mask image for the tile.

15. The system of claim 14, the operations further comprising, for each tile of the subset of tiles:

identifying geo-reference data describing a geographic area represented by the tile;

retrieving a modeling aerial image corresponding to the tile based on the geo-reference data; and generating a pair of modeling aerial image and corresponding mask image, the pair comprising the retrieved modeling aerial image and the mask image generated for the tile.

16. The system of claim 13, the operations further comprising:

incorporating data describing the identified instance of the map feature into an electronic map, the data comprising the bounded geometry; and providing the electronic map comprising the identified instance of the map feature to a device for display, wherein the device is configured to display the identified instance of the map feature based on the bounded geometry.

17. The system of claim 13, wherein determining a bounded geometry enclosing at least a portion of the identified subset of pixels comprises:

generating a mask having at least one region comprising the identified subset of pixels;

removing noise in the mask to determine a simplified shape for the at least one region; and determining a contour surrounding the simplified shape of the at least one region, the contour defining the bounded geometry.

* * * * *